Nov. 24, 1959
C. R. TAYLOR
2,913,990
HYDRAULIC MECHANISM
Filed Nov. 28, 1952
4 Sheets-Sheet 1
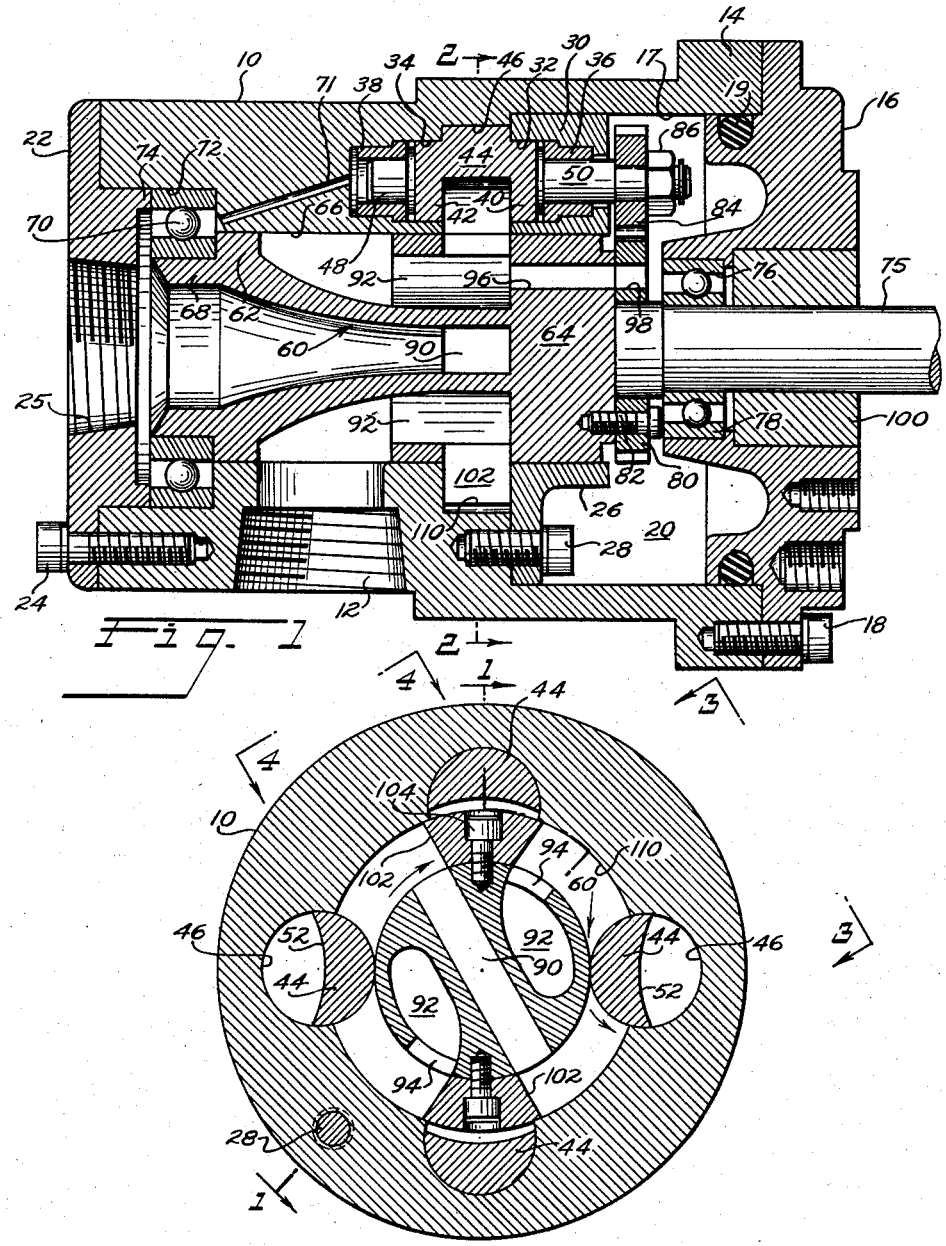
INVENTOR
CHARLES R. TAYLOR
BY
Strauch, Nolan + Diggins
ATTORNEYS Nov. 24, 1959
C. R. TAYLOR
2,913,990
HYDRAULIC MECHANISM
Filed Nov. 28, 1952
4 Sheets-Sheet 2
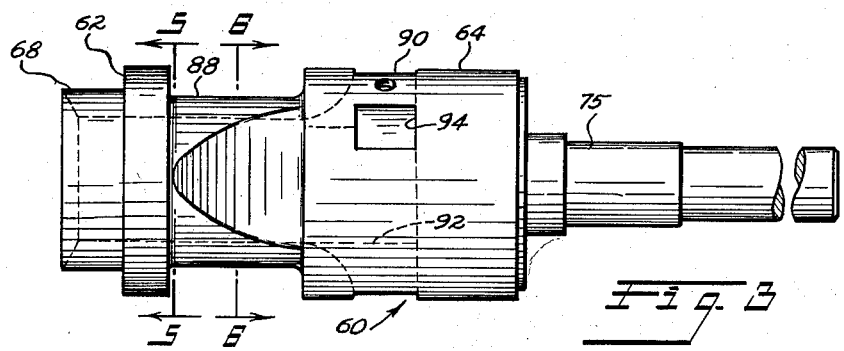
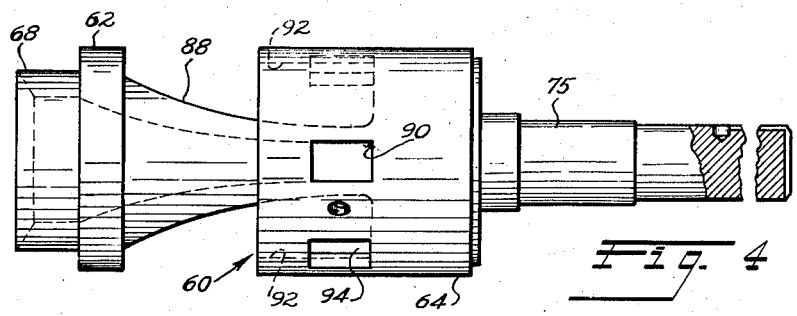
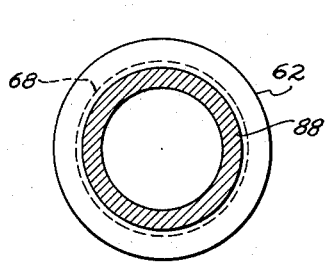
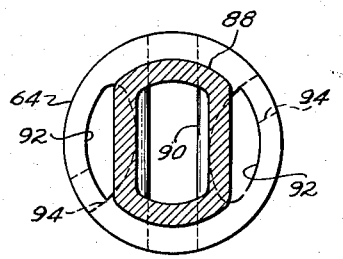
INVENTOR
CHARLES R. TAYLOR
BY *Strauch, Nolan & Diggins*
ATTORNEYS

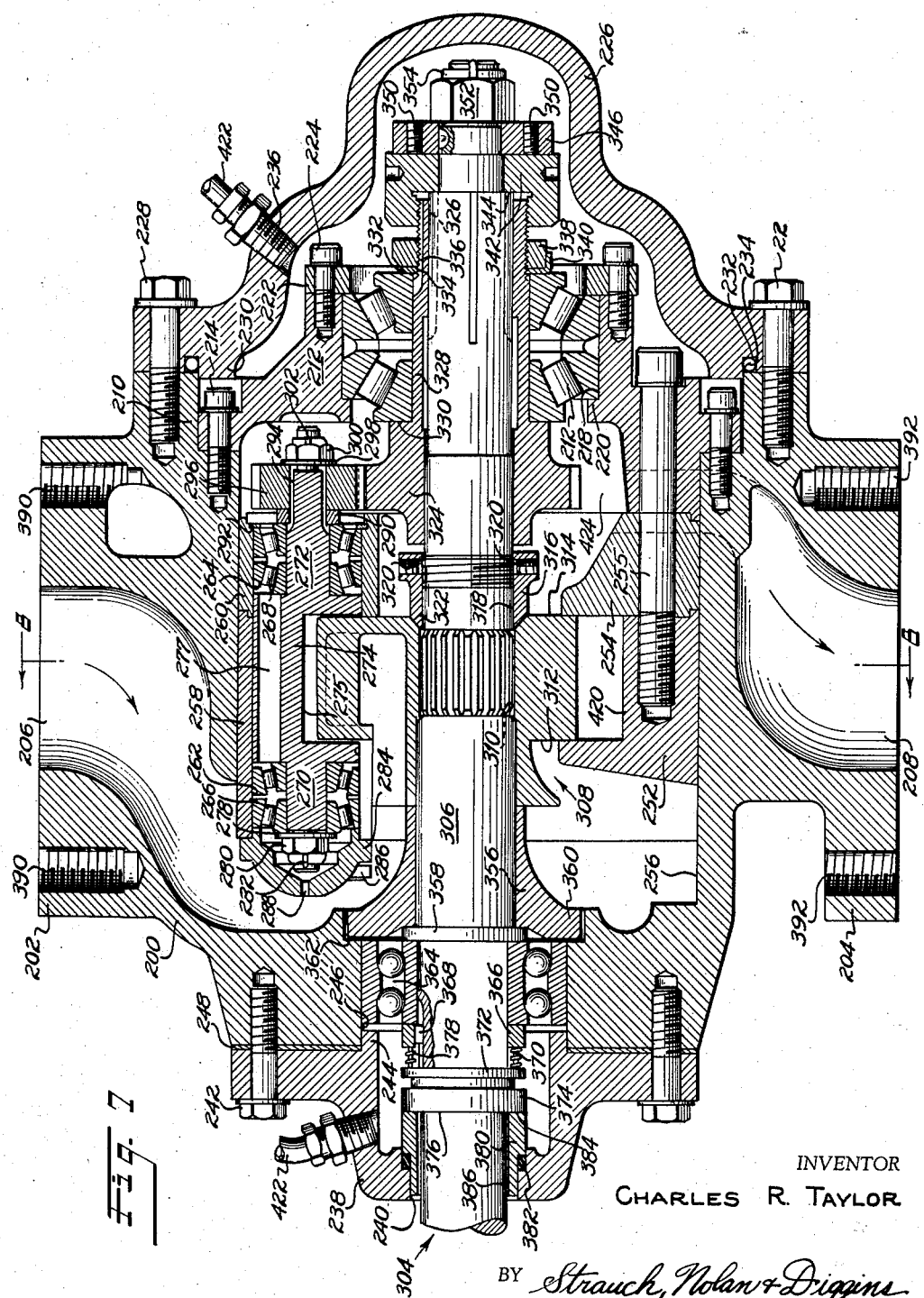

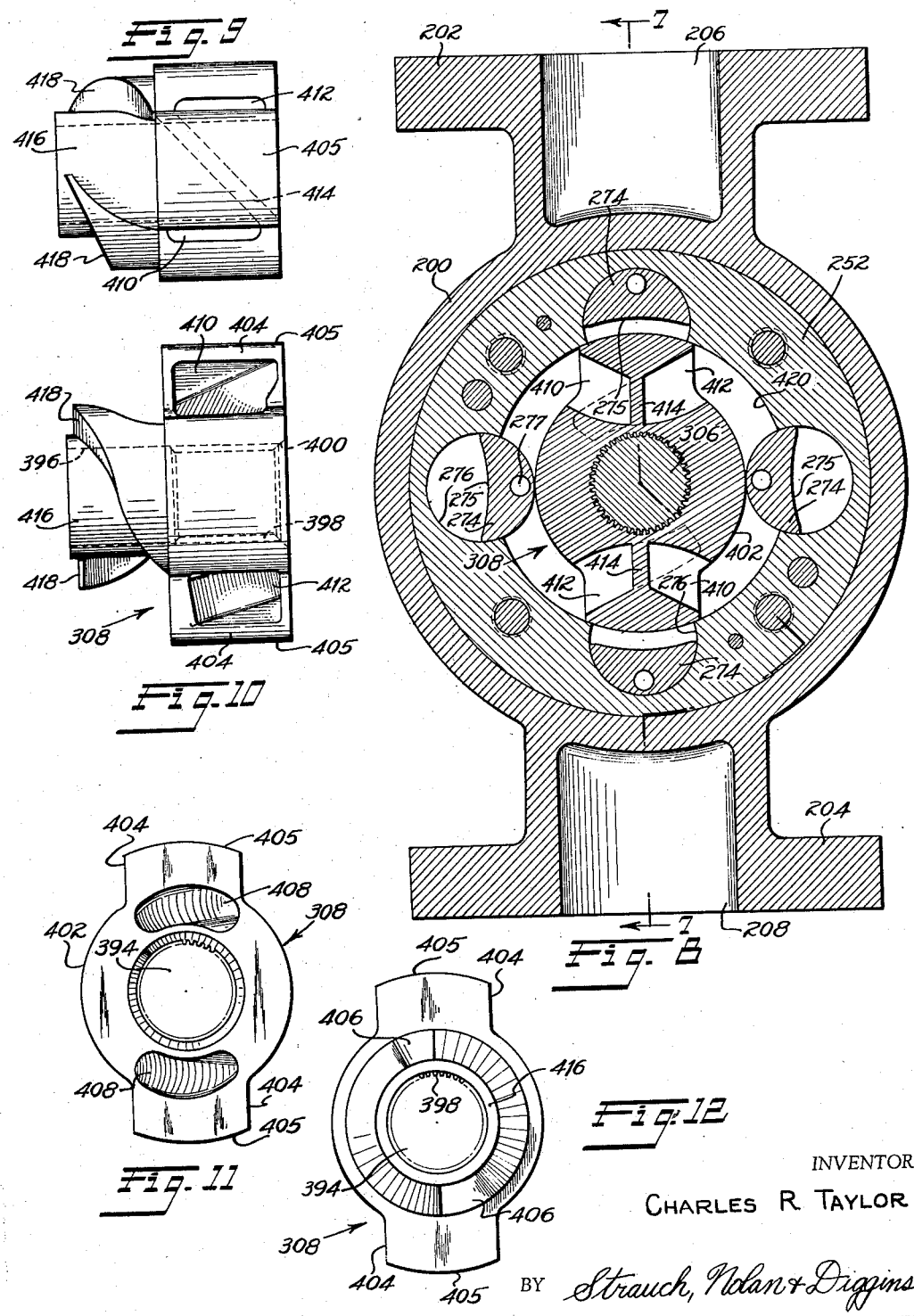

United States Patent Office 2,913,990
Patented Nov. 24, 1959

2,913,990

HYDRAULIC MECHANISM

Charles R. Taylor, Pittsburgh, Pa., assignor to Rockwell Manufacturing Company, Pittsburgh, Pa., a corporation of Pennsylvania Application November 28, 1952, Serial No. 322,916

3 Claims. (Cl. 103—125)

This invention relates to hydraulic mechanisms and more particularly to a rotary hydraulic unit adapted for use as a pump or a motor, and is a continuation-in-part of my copending application Serial Number 220,217, filed April 10, 1951, now abandoned.

Rotary hydraulic units such as pumps and motors heretofore known in the art have been found to have many disadvantages. Most serious of these disadvantages is the undue amount of wear resulting from unbalanced fluid loading of the various bearing members. Additionally, it has been found in practice that the various bearings in such prior art devices were inadequately lubricated also resulting in undue wear and shortened operational life of the bearings. A further disadvantage of the prior art devices is the complexity of the mechanisms which require careful and special assembling and servicing techniques.

The present invention obviates the foregoing and many other difficulties of the prior art devices by primarily providing a novel structure wherein the hydraulic loading imposed by the fluid medium is uniquely balanced to substantially eliminate unbalanced loading of the mechanism, which results in a substantial decrease in wear, smoother operation, and greater efficiency. Additionally unique means have been provided to assure proper and adequate lubrication for the various bearings and relatively moving elements to provide smoother operation and extended service life of the device. The novel rotor and adjustment features, as well as a unique subassembly feature of my novel hydraulic mechanism also result in more efficient operation, lower manufacturing costs, and greater ease of assembly and servicing than heretofore known in prior art designs.

It is the general purpose and object of the present invention to provide a simplified hydraulic unit having increased operating efficiency and extended useful life.

Another object is to provide a hydraulic unit which is dynamically and statically balanced.

It is a more particular object to provide an improved hydraulic unit having division plates mounted at points spaced 180° around the periphery of a rotor for rotation therewith.

It is a further object to provide an improved rotary hydraulic mechanism having rotary vanes mounted in a stationary casing and driven in timed relation with a rotor.

It is a further object to provide a hydraulic unit in which fluid pressures on a rotor are substantially balanced.

It is also an object to provide a novel one piece rotor for a hydraulic mechanism in which the parts are rigid and structurally integral, and which is structurally rugged and relatively inexpensive to manufacture.

It is also an object to provide an improved convertible hydraulic pump or motor having a minimum number of parts which may be readily assembled with simple manual or machine techniques.

It is a more specific object to provide an improved casing for a convertible hydraulic mechanism with an improved mounting for rotary vanes therein.

Yet another object is to provide an improved convertible hydraulic pump or motor having a novel rotor and case subassembly that can be unitarily inserted or removed from the housing.

It is a further object to provide an improved convertible hydraulic pump or motor having novel means for lubricating bearings therein and for purging trapped gases from the system.

It is an object to provide an improved convertible hydraulic, pump or motor having a novel adjustment mechanism for properly adjusting drive gear train and to eliminate axial looseness of the assembly.

Further objects and advantages will become apparent as the description proceeds in connection with accompanying drawings wherein:

Figure 1 is a horizontal longitudinal section of a preferred construction of the improved mechanism taken along line 1—1 of Figure 2 and illustrating the rotor and vane construction and a portion of the internal fluid circuit;

Figure 2 is a transverse section taken substantially along line 2—2 of Figure 1 illustrating the division plates assembled to the rotor;

Figure 3 is a plan view of the rotor with the division plates removed taken in the direction of arrows 3 on Figure 2;

Figure 4 is a plan view of the rotor with the division plates removed taken at 90° to the view of Figure 3 as indicated by arrows 4 of Figure 2; and Figures 5 and 6 are tranverse sectional views of the rotor taken along lines 5—5 and 6—6, respectively, of Figure 3 illustrating the internal contours of the rotor.

Figure 7 is a horizontal longitudinal section of a further embodiment of the improved mechanism taken along the line 7—7 of Figure 8 illustrating the novel one-piece rotor and vane construction, internal fluid circuit, and the means for obtaining fluid balance;

Figure 8 is a transverse section taken substantially along line 8—8 of Figure 7;

Figure 9 is a top plan view of the novel one-piece rotor;

Figure 10 is a side elevational view of the novel one-piece rotor;

Figure 11 is a rear elevational view of the novel one-piece rotor; and

Figure 12 is a front elevational view of the novel one-piece rotor.

For purposes of illustration, the improvements are here shown as applied to hydraulic motor or pump of the double-acting type in which the intake and discharge phases occur in each revolution of the rotor. However, it will be understood that many of the novel features of the invention to be presently described are applicable as well to a pump or motor of the single acting type.

Referring now more particularly to the drawing, 10 indicates an annular casing or housing of generally cylindrical form open at its opposite ends and having a threaded discharge port 12 at one side intermediate its ends. At one end, the casing 10 is provided with a machined mounting flange 14 to which an annular closure plate 16 is secured in fluid tight relation by a plurality of circumferentially spaced screws 18. A reduced portion of the plate 16 extends into a central bore 17 in housing 10 and is provided with a sealing ring 19 to form a sealed chamber 20 adjacent the end of housing 10. A plate 22 is secured to the machined end surface at the opposite end of the housing 10 as by screws 24. A central threaded inlet aperture 25 is provided in the plate 22 for connection to a suitable fluid conduit not shown.

An annular plate 26 is positioned in the bore 17 and is secured to an internal shoulder formed at the inner end of bore 17 as by screws 28. The plate 26 is provided with four bosses 30 spaced at 90° intervals around its periphery, each having a stepped machined bore 32 extending axially therethrough in axial alignment with machined recesses 34 formed in a thickened wall section of housing 10. Identical axially aligned annular bearing inserts 36 and 38 are received with a force fit in reduced sections of bores 32 and recesses 34, respectively.

Reduced sections 40 and 42 of four identical circular vanes 44 are received within bores 32 and 34, respectively, with a close running fit, a central enlarged section of the vanes being received in cylindrical recesses 46 in housing 10. Shafts 48 and 50 formed integrally with the opposite ends of vanes 44 are journaled in bearings 38 and 36 respectively, shaft 50 extending through plate 26 into space 20. A close running fit is maintained between the vanes and the associated stationary surfaces to minimize fluid leakage around the vanes and at the same time permit the free rotation thereof. The central portion of one side of each of the vanes 44 is cut away to form a recess or pocket having an arcuate bottom surface 52 as shown in Figure 2.

A rotor indicated generally at 60 having spaced cylindrical sections 62 and 64 is rotatably received within housing 10 with section 62 and a portion of section 64 positioned for rotation with a close running fit within a central bore 66 in housing 10. A reduced cylindrical extension 68 of the rotor 60 is rotatably supported in a bearing 70 mounted in a recess 72 in housing 10 and clamped against the inner shoulder thereof by a reduced extension 74 of the closure plate 22. Bearing 70 is thus lubricated by the fluid passing through the unit. Inclined passages 71 carry a portion of this fluid to each of the bearings 38 and the vanes 44. At its opposite end the rotor 60 is provided with an axially extending power shaft 75 rotatably supported in bearing 76 which is mounted in a central bore 78 in the closure plate 16 and clamped between co-operating shoulders on the shaft 75 and the bore 78. It will be seen that by the employment of suitable shims or other spacers the axial position of the rotor may be readily and accurately adjusted.

A gear 80 is telescoped over the shaft 75 and is secured to the outer end of the rotor as by screws 82. In the assembled unit gear 80 meshes with pinion gears 84 mounted for rotation with each of the shafts 50 by retainer nuts 86 threaded onto the outer end of shafts 50 so that vanes 44 are rotated in timed relation with rotor 60.

Referring now more particularly to the details of the rotor construction as shown in Figures 2–6, cylindrical sections 62 and 64 are joined by an integral central section 88 (Figure 4) of decreasing width, with the narrowest section adjacent cylindrical section 64. The hollow interior of the section 88 communicates at one end with the open ended hollow interior of rotor 60 and at its opposite end with a transverse passage 90 which extends through section 64 to form fluid inlet passages. A pair of elongated recesses 94 are formed in section 64 with their longitudinal axes substantially parallel to the axis of the rotor. Recesses 92 are open at the inner face of the sections 64 and at their opposite ends communicate with the exterior of section 64 through ports 94 which are radially spaced from but are in the same longitudinal location as the ends of passage 90. The passage 90 is in communication with the space 20 through an opening 96 in the end of the section 64 and a registering opening in gear 80, to supply fluid to the space 20 so that gears 80 and 84 and the bearing 76 run in a fluid bath and also to balance the longitudinal fluid pressures acting on the rotor. A seal 100 is provided around shaft 75 to prevent leakage of fluid around the shaft.

As best shown in Figure 2 a pair of wedge shaped arcuate division plates 102 are secured to the cylindrical section 64 by screws 104 so as to cover the lands formed between ports 94 and the ends of passage 90 to prevent direct fluid communication therebetween. The outer arcuate surfaces of plates 102 rotate within bore 110 in housing 10 with a close running fit.

It will be seen from Figure 1 that the pockets in the vanes 44 are of slightly greater length than the division plates 102, and the bottom surface 52 is of sufficient depth to permit the passage of the plates 102 when the vanes are turned so that the bottom of the pocket faces a division plate as shown in Figure 2. It will also be seen that the vanes are so proportioned that when their positions are reversed they are in substantially fluid tight rolling contact with the surface of the rotor and form with plates 102, four substantially fluid tight working chambers.

The unit may be operated as a pump by connecting the port 25 to a suitable source of fluid and port 12 to a discharge conduit and by connecting shaft 75 to a suitable source of power for revolving the rotor in a clockwise direction as shown by the arrow in Figure 2. It will be appreciated that the gears 84 are positioned with respect to the gear 80 during assembly so that the rotor and vanes will assume the relative positions shown in Figure 2.

As the rotor moves in a clockwise direction, the opposite chambers adjacent ports 94 decrease in size forcing liquid through ports 94, and recesses 92 to the outlet passage 12. Simultaneously the chamber at the outer ends of the slot 90 will expand causing fluid to flow into the spaces from inlet port 25 through the interior of section 88 and through slot 90. As the rotor continues to revolve the cycle is repeated providing a substantially continuous flow of fluid through the mechanism.

It is to be noted that the contacting surfaces of the vanes and the rotor are moving in the same direction at the substantially same speed, since the gears 80 and 84 are of the same diameter, respectively, as the rotor 60 and the vanes 44. This arrangement makes possible a relatively high sealing contact pressure between the surfaces without correspondingly high friction losses and rapid wear.

Further, pressure in the opposed working chambers is maintained in substantial equality throughout the operating cycle of the unit thus maintaining the rotor in a condition of dynamic balance at all times. Variation in radial bearing load is thereby virtually eliminated. Axial bearing load is also reduced to an extremely low value by virture of the fact that the area at the inner end of recesses 92 is equal to the projected area of the outer surface of section 88 and the side wall of recess 92 which form a continuation of this surface. The slight axial load which may be imposed on the rotor by the incoming fluid will be substantially balanced by the pressure maintained in space 20 by passage 96.

It will be appreciated that the unit will function as a motor if either of the conduits 12 or 25 is connected to a pressure source and the other is connected to exhaust. The shaft 75 may then be connected to any suitable power consuming device to abstract useful work.

Turning now to Figure 7 there is shown a further embodiment of the novel mechanism wherein 200 indicates a hollow open-ended housing of generally cylindrical form. A pair of flanged projections 202 and 204 approximately 180 degrees apart extend from the sides of the housing substantially intermediate its ends and are respectively provided with inlet port 206 and outlet passage 208. At one end housing 200 is provided with machined mounting flange 210 to which annular plate 212 is secured, as by bolts 214. Bearing 216 is mounted in bore 218 with a press fit and abuts shoulder 220 at one end of annular plate 212. Ring 222 is secured to the other end of annular plate 212 as by bolts 224 and forms a retaining shoulder to hold the bearing in bore 218.

A cover plate 226 is secured by bolts 228 to the face of machined flange 210 and has shoulder 230 fitting into the bore of flange 210 and abutting the exposed face of annular plate 212 to further retain the annular plate. Groove 232 is machined in cover plate 226 to receive compressible O-ring seal 234 which forms a fluid tight seal between the cover plate and a face of flange 210. Threaded opening 236 is provided in cover plate 226 for a purpose to be hereinafter described.

A second cover plate 238 having a bore 240 is secured to the machined surface at the opposite end of housing 200 by bolts 242 and has a shoulder 244 which snugly fits in bore 246. Gasket 248 is compressibly disposed between cover plate 238 and the housing to form a fluid tight seal therebetween. Threaded opening 250 is provided in cover plate 238 for a purpose hereinafter to be described.

A pair of interfitting annular ring members 252 and 254, forming an inner casing, are mounted in close fitting relation in bore 256 of housing 200 and are secured to each other and to annular plate 212 by bolts 255 in non-rotative relation within the housing. Each ring is provided with four bosses 258 and 260 in respective axial alignment spaced at 90° intervals about the periphery of the respective ring member. Each boss has identical axially aligned bores or vane compartments 262 and 264 for respectively mounting bearings 266 and 268, with a force fit. Journals 270 and 272 of four identical vanes 274 are respectively press fitted into bearings 266 and 268 so that an inner end of each bearing abuts a respective end of circular vane portion 274. The circular vane portions 274 have a close running fit in circular recesses 276 formed in the bosses 258 and 260. The central portion of one side of each vane 274 is cut-away to form a recess or pocket having an arcuate bottom surface 275.

Each vane 274 is also provided with a through passage 277 the purpose of which will hereinafter be described. A thrust washer 278 is mounted on journal 270 in abutting relation with the inner race of bearing 266 and is held in place by retaining nut 280 mounted on a threaded portion of journal 270 and secured in place as by a cotter pin 282. A cover or cap 284 mounted on the end of the boss has a shoulder snugly fitting into bore 262 abutting the outer race of bearing 266 and is secured in place by bolts 286. Each cap is provided with an opening or orifice 288 for a purpose to be hereinafter described. A thrust washer 290 is mounted on journal 272 in abutting relation with the inner race of bearing 268, while a snap ring 292 fitting into ring 260 abuts and retains the outer race of bearing 268. Journal 272 is splined as at 294 for non-rotatably mounting gear 296. Thrust washer 298 is mounted in abutting relation with gear 296 and is held in place by nut 300 threadedly engaging journal 272 and secured thereto as by cotter pin 302.

A shaft assembly generally designated 304 comprises a shaft 306 having a rotor generally designated 308 with an accurately machined bore slidably engaging a similarly accurately machined diameter of the shaft, the rotor is also partially splined thereto as at 310. Opposite parallel faces 312 and 314 of the rotor are in respective sliding contact with annular rings 252 and 254. The length of arcuate pocket 275 is just slightly greater than the distance between parallel faces 312 and 314 for a purpose which will hereinafter be apparent. A collar or cone 316 having an accurately ground inner diameter 318 and a threaded portion is threadedly mounted on shaft 306 and secured thereto by set screws 320 with the ground inner diameter in contact with a similarly accurately ground diameter on the shaft, to thereby accurately center the collar. One end of collar 316 is provided with an accurately machined cone face 322 for engaging a similarly machined cone on an end of rotor 308 radially center the rotor on shaft 306.

Vane gears 296 are constantly in mesh with drive gear 324 which has an accurately machined bore mounted on a similarly machined diameter of shaft 366 and is also splined to the shaft as at 326. The inner bearing race of bearing 212 is press fitted on to tail portion 328 and into abutting contact with shoulder 330 of the drive gear. Lockwasher 332 is mounted on tail portion 328 in abutting contact with the inner race of bearing 212 and has tabs 334 which slidably fit into slots 336 in tail portion 328. Nut 338 is threadedly mounted on tail portion 328 and forces washer 332 into engagement with the bearing to prevent any longitudinal movement thereof. An external tab 340 on washer 332 is bent over one of the flats on the outer periphery of nut 338 to hold the nut in non-rotative relation to tail portion 328.

Recessed nut 342 is slidably mounted on shaft 306 and is threaded on to tail portion 328 into abutting contact with shoulder 344 of shaft 306. A take-up or adjustment ring 346 is keyed to shaft 306 as at 348 and is provided with axially extending set screws 350 for abutting contact with the outer face of recessed nut 342. Nut 352 is threaded on the end of shaft 306 in contacting relation with take-up ring 346 and is prevented from loosening by cotter pin 351. Set screws 350 can be forced against recessed nut 342 to take up any axial looseness between gear 324 and shaft 306 and to properly adjust the mesh of gears 296 with drive gear 324.

An arcuately shaped thrust member 356, preferably of bearing bronze, is press fitted on shaft 306 so as to abut an integral shaft shoulder 358 at one end and to contact rotor 308 at the other end. Radially outwardly extending flange 360 of thrust member 356 fits into recess 362 of housing 200 with sufficient rotative clearance therebetween. Thus it will be seen that rotor 308 is accurately located both longitudinally and radially on shaft 306 by collar 316 and thrust member 356.

The inner race of bearing 364 is press fitted on shaft 306 in abutting relation with the opposite side of shaft shoulder 358, while the outer race is press fitted in bore 246. A shaft seal drive ring 366 is keyed to shaft 306 as at 368 and is provided with a plurality of axially extending drive pins 370 which engage apertures (not shown) in ring 372 rigidly secured to rotating seal ring 374. Rotating seal ring 374 which is integral with ring 372 rotates with shaft 306 by virtue of the drive pin connection with drive ring 366, has a running face 376 held square with its axis and preferably of a high carbon steel having a mirror finish. An O-ring seal (not shown) is disposed between shaft 306 and ring 372 to prevent passage of fluid therebetween.

Stationary seal ring 380 is mounted in housing bore 240 and is provided with a shoulder to cooperate with a shoulder in bore 240 for the reception of O-ring seal 382 therebetween. Face 384 of ring 380 which is in relative sliding contact with face 376 is held square with its axis and is of a material, such as carbon, capable of a mirror finish. The frictional engagement of ring 380 and O-seal 382 is sufficient to overcome the low torque created by the relative sliding faces and to maintain ring 380 stationary with respect to the housing, however, if necessary suitable means can be employed to prevent rotation of ring 380. Ring 380 is provided with a sufficiently large inner diameter 386 to permit shaft 306 to extend therethrough in non-interfering rotative relation. The intimate rotating contact of faces 376 and 384 form an efficient shaft seal preventing any leakage axially along the shaft.

It will be noted that should there be any axial looseness between the shaft and members mounted thereon set screws 350 may be threaded inwardly against the face of recessed nut 342. This threading of the set screws will draw the shaft to the right, as shown in Figure 7 and will take up any looseness in the assembly and permit proper meshing adjustment of gears 296 and 324. It should also be noted that the removal of cover plates 212 and 226 will permit the removal of the entire vane and shaft assemblies as a unit which results in ease of disassembly and servicing of the unit. Tapped holes 390 and 392 in flanges 202 and 204 respectively facilitate the attachment of suitable intake and outlet lines.

Turning now to Figures 9 through 12 there is shown a top, side, rear, and front view respectively of the novel integral rotor unit, designated 308. Axial bore 394 comprises an accurately machined surface 396 and a splined surface 398. Conical surface 400 is accurately ground in the end of the rotor adjacent the splines for mating engagement with the conical surface on collar 316 for proper radial centering of the rotor on shaft 306. The rotor comprises a cylindrical body 402 and radially outwardly extending hollow segmental portions 404, having curved outer surface 405, each provided with inlet and outlet openings 406 and 408 respectively and side openings 410 and 412. An angulated internal wall 414 connects diagonally opposite ends of each segmental portion whereby openings 406 and 410 are in communication but are separated from direct communication with respectively connected openings 408 and 412. A cylindrical boss 416 of smaller diameter than body 402 extends outwardly from the face having inlet openings 406 therein, and is provided with a pair of peripherally disposed spiral scoops 418 each extending helically through 180° from the outer end of the boss inwardly to merge with a respective angulated wall 414.

In the assembled position as shown in Figures 7 and 8 rotor 308 unitarily rotates with shaft 306 and arcuate surfaces 405 are in close rotating contact with bore 420 of rings 252 and 254. Gear 324 which is splined to shaft 306 imparts rotation to the vane gear 296 and finally to vanes 274. The vanes are assembled for timed rotation with respect to the rotor so that they will function as shown in Figure 8 and will not interfere with segmental portions 404. It will be seen from Figure 7 that the pockets in vanes 274 are of slightly greater length than the width between faces 312 and 314 of rotor 308, and the bottom arcuate surface 275 is of sufficient depth to permit the passage of the segments 404, as shown by the top and bottom vanes in Figure 8. When the vanes are in the condition shown by the right and left hand vanes in Figure 8 the solid arcuate surface of the vane is in substantially fluid tight rolling contact with cylindrical body 402 and form with segments 404, four substantially fluid tight working compartments.

Fluid line or conduit 422 interconnects openings 236 and 250 for a purpose which will hereinafter be described in connection with the operation of the mechanism.

The unit may be operated as a pump by connecting the port 206 to a suitable source of fluid and port 208 to a discharge conduit and by connecting shaft 306 to a suitable source of power to revolve the rotor in a clockwise direction as shown by the arrow in Figure 8.

As the rotor moves in a clockwise direction, the opposite chambers adjacent side openings 412 decrease in size forcing liquid through the side openings 412, through outlet openings 408 to outlet passage 208. Simultaneously the chambers adjacent side openings 410 will expand causing fluid to flow into the spaces from inlet 406 through side opening 410. As the rotor revolves the vanes also rotate, by virtue of the constantly meshed gears closing off the chambers which were previously open to inlet fluid and opening the chambers from which fluid was discharged to inlet fluid, so that diametrically opposed chambers are alternately open to inlet and then to discharge. Continued high speed rotation of the rotor causes the cycle to be repeated providing a substantially continuous flow of fluid through the mechanism.

It is to be noted that the contacting surfaces of the vanes and the rotor are moving in the same direction at substantially the same speed, since gears 296 and 324 are of the same diameter, respectively, as the vanes 274 and rotor 308. This feature makes possible a relatively high sealing contact pressure between the surface without correspondingly high friction losses and rapid wear.

The dynamic balancing of the mechanism is of particular importance resulting in smooth performance and a minimum amount of wear. The fluid pressure in opposed chambers is always maintained in substantial equality throughout operation thus maintaining the rotor in a condition of balance. Variation in radial bearing load is thereby virtually eliminated. Axial bearing loads are also uniquely balanced and virtually eliminated. The projected area of arcuate member 356 exposed to inlet fluid pressure is substantially equivalent to the area of the rotor which is exposed to inlet fluid. At the same time outer ends of rotor 308 and arcuate member 356 which are of substantially the same area are exposed to the same degree of discharge fluid pressure by virtue of fluid line or conduit 422 connecting both of these sides to discharge fluid pressure, since thrust member 356 is exposed to inlet and discharge pressures in directions opposite to that imposed on the rotor, axial bearing loads imposed by the incoming and discharge fluid pressure on the rotor are effectively and efficiently balanced or cancelled. The delivery of fluid to opening 250 by line 422 serves the additional purpose of supplying the necessary lubricant to bearing 364.

Discharge fluid pressure in chamber 424 also lubricates vane bearing 268 and passes therethrough and through passage 277 to lubricate bearings 266 from which it passes through orifice 288 to the lower pressure inlet port. This flow of fluid through the vane bearings and orifice 288 in addition to lubricating and exposing both sides of bearings 266 and 268 to substantially the same pressure also serves the further purpose of purging any gases that may be trapped in the chamber of bearing 266, which frequently occurs when pumping fluids such as petroleums.

The entire operating mechanism within the housing; that is, the vane, rotor, and shaft assemblies constitute a subassembly which can be easily removed from the housing merely by disconnecting cover plates 212 and 226. By virtue of this subassembly feature inspection, servicing, and assembly of the unit is greatly facilitated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hydraulic mechanism comprising a supporting structure having a bore and inlet and outlet openings connecting said bore with the exterior of said supporting structure; a rotor assembly journalled for rotation in said bore coaxially thereof, the periphery of said rotor assembly being radially spaced from said bore to form a working space therewith; circumferentially spaced members rigid with said rotor assembly at diametrically opposed points thereon and extending into close clearance relation with said bore; a plurality of pairs of vanes mounted at diametrically opposed points in said structure for rotation about axes substantially paralled with the axis of said rotor assembly; means for cyclically moving said vanes into said working space and in close clearance relation with said rotor and out of said working space to permit the passage of said members to thereby form with said bore, said rotor and said members a plurality of alternately expanding and contracting chambers; means defining passages in said rotor continuously connecting said expanding chambers to said inlet opening and said contracting chambers to said outlet opening, whereby fluid is caused to flow continuously through the mechanism from the inlet opening to the outlet opening; means forming radially extending surfaces on said rotor, certain of said surfaces facing one end of said rotor and the remaining surfaces facing the opposite end of said rotor, the projected area of the surfaces facing said one end of said rotor and connected to the inlet pressure being equal to the projected area of the surfaces facing the other end of the rotor and connected to inlet pressure, and the projected area of the surfaces facing said one end of said rotor and connected to the outlet pressure being equal to the projected area of the surfaces facing said other end of said rotor and connected to outlet pressure whereby axially directed fluid forces on said rotor assembly are balanced.

2. The hydraulic mechanism according to claim 1 wherein said rotor assembly includes a thrust member and certain of said surfaces are formed on said thrust member.

3. A hydraulic mechanism comprising a supporting structure having a bore and inlet and outlet openings connecting said bore with the exterior of said housing; spaced main bearing assemblies in said supporting structure; a rotor journalled on said main bearing assemblies for rotation in said bore about the axis of said bore, the periphery of said rotor being radially spaced from said bore to form a working space therewith; circumferentially spaced members rigid with said rotor extending into close clearance relation with said bore; a plurality of circumferentially spaced vanes; additional bearing assemblies mounted in said structure for supporting said vanes for rotation about axes substantially parallel with the axis of said rotor; means for cyclically moving said vanes into said working space in close clearance relation with said rotor and out of said working space to permit the passage of said members to thereby form with said rotor, said members and said bore a plurality of alternately expanding and contracting chambers; means defining passages continuously connecting said expanding chambers to said inlet opening and said contracting chambers continuously to said outlet opening whereby fluid is caused to flow continuously through the mechanism from the inlet opening to the outlet opening, means defining passage means connecting the outlet opening to the space around the said main bearing assemblies to lubricate said main bearing assemblies and means defining passage means for placing the outlet opening in free communication with the space around said additional bearing assemblies to lubricate said additional bearing assemblies, said last-mentioned means including passages extending through said vanes and a restricted connection to said inlet opening to permit continuous limited flow over said flow of said fluid over said bearings.

References Cited in the file of this patent

UNITED STATES PATENTS

| | | |
|---|---|---|
| 622,949 | Green | Apr. 11, 1899 |
| 648,024 | Filteau | Apr. 24, 1900 |
| 791,302 | Stewart | May 30, 1905 |
| 869,147 | Smith | Oct. 22, 1907 |
| 958,416 | Metcalf et al. | May 17, 1910 |
| 976,539 | Bender | Nov. 22, 1910 |
| 1,268,248 | Jackman et al. | June 4, 1918 |
| 1,269,735 | Ogden | June 18, 1918 |
| 1,347,343 | Ljungstrom | July 20, 1920 |
| 1,347,344 | Ljungstrom | July 20, 1920 |
| 1,372,576 | Tullman | Mar. 22, 1921 |
| 1,379,587 | Fisher | May 24, 1921 |
| 1,395,114 | Jackman | Oct. 25, 1921 |
| 1,635,522 | Wilson | July 12, 1927 |
| 1,729,826 | Green | Oct. 1, 1929 |
| 2,130,054 | Whitfield | Sept. 13, 1938 |
| 2,180,378 | Whitfield | Nov. 21, 1939 |
| 2,386,257 | Muller | Oct. 9, 1945 |
| 2,390,880 | Harrold | Dec. 11, 1945 |
| 2,416,396 | Landrum | Feb. 25, 1947 |
| 2,418,793 | Selden | Apr. 8, 1947 |
| 2,418,967 | Clark | Apr. 15, 1947 |
| 2,442,130 | Johnson | May 25, 1948 |
| 2,447,608 | Berry | Aug. 24, 1948 |
| 2,466,759 | Baylin | Apr. 12, 1949 |
| 2,483,705 | Levetus et al. | Oct. 4, 1949 |
| 2,635,552 | Dale et al. | Apr. 21, 1953 |
| 2,638,848 | Johnson | May 19, 1953 |
| 2,655,112 | White | Oct. 13, 1953 |
| 2,697,912 | Berry | Dec. 28, 1954 |
| 2,713,309 | Berry | July 19, 1955 |
| 2,751,846 | Lapsley | June 26, 1956 |
| 2,775,209 | Albright | Dec. 25, 1956 |
| 2,776,086 | Selden | Jan. 1, 1957 |

FOREIGN PATENTS

| | | |
|---|---|---|
| 66,430 | Netherlands | Sept. 15, 1950 |
| 447,024 | Great Britain | May 11, 1936 |
| 602,836 | Great Britain | June 3, 1948 |
| 851,005 | France | Sept. 25, 1939 |
| 969,380 | France | May 24, 1950 |